United States Patent [19]

Caulfield et al.

[11] Patent Number: 5,004,309

[45] Date of Patent: Apr. 2, 1991

[54] NEURAL PROCESSOR WITH HOLOGRAPHIC OPTICAL PATHS AND NONLINEAR OPERATING MEANS

[75] Inventors: H. John Caulfield; Charles F. Hester; Jason M. Kinser; Joseph Shamir, all of Huntsville, Ala.

[73] Assignee: Teledyne Brown Engineering, Ala.

[21] Appl. No.: 365,441

[22] Filed: Jun. 13, 1989

Related U.S. Application Data

[63] Continuation-in-part of Ser. No. 233,575, Aug. 18, 1988, abandoned.

[51] Int. Cl.$^5$ .............................................. G03H 1/12
[52] U.S. Cl. ................................. 350/3.68; 350/3.74; 364/822
[58] Field of Search ............... 350/162.16, 162.12, 350/162.17, 162.18, 162.13, 3.74, 3.66, 3.67, 3.68; 364/727, 713, 807, 822, 841; 365/125

[56] References Cited

U.S. PATENT DOCUMENTS

| | | | |
|---|---|---|---|
| 4,040,039 | 8/1977 | Hanson et al. | 340/174 |
| 4,567,569 | 1/1986 | Caulfield | 364/845 |
| 4,607,344 | 8/1986 | Athale | 364/841 |
| 4,660,166 | 4/1987 | Hopfield | 364/807 |
| 4,705,344 | 11/1987 | Hinton et al. | 350/3.73 |
| 4,739,496 | 4/1988 | Marom et al. | 365/125 |
| 4,750,153 | 6/1988 | Owechko | 365/125 |
| 4,752,906 | 6/1988 | Kleinfeld | 364/807 |
| 4,762,397 | 8/1988 | Pepper | 350/331 R |
| 4,809,204 | 2/1989 | Degenais et al. | 364/713 |
| 4,815,027 | 3/1989 | Tokumitsu | 364/841 |
| 4,860,253 | 8/1989 | Owechko et al. | 365/125 |
| 4,862,406 | 8/1989 | Fisher | 364/807 |
| 4,892,370 | 1/1990 | Lee | 350/3.74 |

OTHER PUBLICATIONS

H. J. Caulfield et al., "Optical Computing: The Coming Revolution in Optical Signal Processing", Laser Focus/Electro-Optics, Nov. 1983, pp. 100-110.

Kosko, B., Society for Photo Optical Instrumentation and Engineers (SPIE), Proceedings: Image Understanding, vol. 758, Jan. 1987.

Kosko, B., "Competitive Adaptive Bidirectional Associative Memories", Proceedings of the International Conference on Neural Networks, Jun. 1987.

Kosko, B., "Adaptive Bidirectional Associative Memories", Appl. Opt., vol. 26, No. 23 (Dec., 1987).

Goodman, J. W., Dias, A. R., Woody, L. M., "Fully Parallel, High Speed Incoherent Optical Method for Performing Discrete Fourier Transforms", Opt. Lett. 2, pp. 1-3.

Kosko, B., and Guest, C., "Optical Bidirectional Associative Memories", (1978), Society for Photo Optical Instrumentation and Engineers (SPIE), Proceedings: Image Understanding, vol. 758, 1987.

(List continued on next page.)

Primary Examiner—Bruce Y. Arnold
Assistant Examiner—J. P. Ryan
Attorney, Agent, or Firm—Beveridge, DeGrandi & Weilacher

[57] ABSTRACT

An optical apparatus for simulating a highly interconnected neural network is disclosed as including a spatial light modulator (SLM), an inputting device, a laser, a detecting device, and a page-oriented hologaphic component. The inputting device applies input signals to the SLM. The holographic component optically interconnects $N^2$ pixels defined on the spatial light modulator to $N^2$ pixels defined on a detecting surface of the detecting device. The interconnections are made by $N^2$ patterns of up to $N^2$ interconnection weight encoded beams projected by $N^2$ planar, or essentially two-dimensional, holograms arranged in a spatially localized array within the holographic component. The SLM modulates the encoded beams and directs them onto the detecting surface wherein a parameter of the beams is evaluated at each pixel thereof. The evaluated parameter is transformed according to a nonlinear threshold function to provide transformed signals which can be fed back to the SLM for further iterations.

20 Claims, 4 Drawing Sheets

OTHER PUBLICATIONS

Farhat, N. H., "Architectures for Optoelectronic Analogs of Self-Organizing Neural Networks", Opt. Lett. 12, 6 (1987).

Caulfield, H. J., Parallel $N^4$ Weighted Optical Interconnections, Appl. Opt., 26, pp. 4039-4040 (1987).

Shamir, J., "Three-Dimensional Optical Interconnection Gate Array", Appl. Opt., 26, pp. 3455-3457 (1987).

Handschy, M. A., Johnson, K. M., Cathey, W. T. and Pagano-Stauffer, L. A., "Polarization-Based Optical Parallel Logic Gate Utilizing Ferroelectric Liquid Crystals", Opt. Lett. 12, 8, pp. 611-613 (1987).

Gibbs, H. M. and Peyghambarian, N., "Nonlinear Etalons and Optical Computing", SPIE vol. 700, IOCC Proceedings: 1986 International Optical Computing Conference, pp. 64-70.

Smith, S. D., "Optical Bistability, Photonic Logic and Optical Computation", Appl. Opt., vol. 25, No. 10, pp. 1550-1564 (1986).

NEURAL PROCESSOR WITH HOLOGRAPHIC OPTICAL PATHS AND NONLINEAR OPERATING MEANS

This application is a continuation-in-part of U.S. application Ser. No. 07/233,575 filed on Aug. 18, 1988 and now abandoned.

BACKGROUND OF THE INVENTION

The present invention pertains to an optical system including a page-oriented holographic means for providing a highly parallel computational device which simulates neural operation. More particularly, the present invention pertains to a system including holographic means comprising a plurality of essentially two-dimensional, spatially localized holograms arranged in an array for projecting interconnection weight encoded beams to interconnect a spatial light modulator which modulates the beams in response to input signals and a detecting means which performs a nonlinear transformation on the modulated beams to produce output signals.

Figure 1:
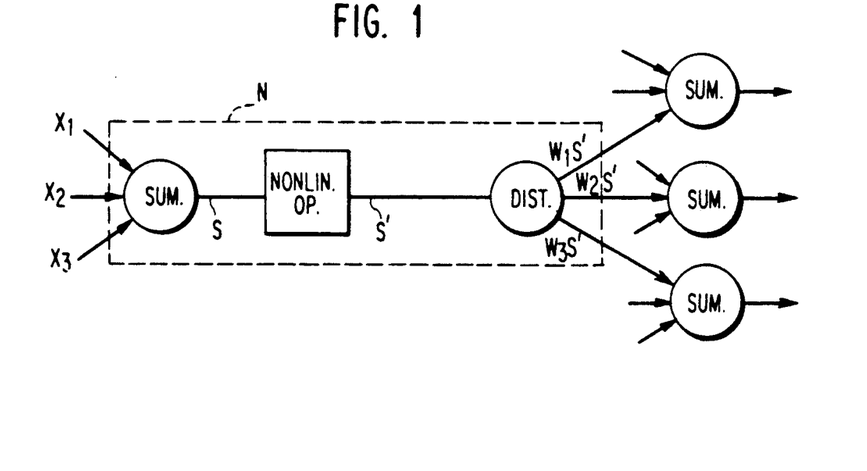
FIG. 1 is a schematic view illustrating a model for an interconnected neuron.

This invention relates to an optical system providing what has become known in the art as a "neural network". Such a network comprises devices that simulate the responses of biological neurons. A model for a neuron N is shown in FIG. 1 to receive three inputs $X_1$, $X_2$, and $X_3$ at a device which sums the inputs according to the simple equation $S = X_1 + X_2 + X_3$. Positive X's may be defined as excitatory and tend to make the model neuron "fire", that is provide a nonzero output. Negative X's, defined as inhibitory, tend to prevent the model neuron from firing. A nonlinear operator changes an output signal from the output S of the summing device into a new signal according to a particular response curve to be discussed in detail infra. A low input signal to the nonlinear operator, that is a signal below some threshold, $S_0$, results in a zero output at the nonlinear operator. A high input signal gives a fixed maximum output. An intermediate input results in an intermediate output. Output S' from the nonlinear operator is applied to still other neurons after multiplication by a weighting factor W by a distributor. The signals $W_1S'$, $W_2S'$, and $W_3S'$ are proportional to S' and may be either strong or weak excitatory signals or strong or weak inhibitory signals.

"Technological" or "artificial" neural networks also mimic biological neural networks by arrangement of the neurons in layers as indicated in FIG. 1. The information, memory, and problem solving methods characteristic of the system are determined by the interconnections in the system, that is what is interconnected to what and with what strength. In providing a model neural network, the model neurons are made to communicate laterally on the same layer and to communicate with neurons in other layers.

For various applications, the power of systems simulating neural activity over conventional, sequential machines has been well recognized by the prior art. For instance, Hopfield U.S. Pat. No. 4,660,166 states that many practical problems take such an enormous amount of computation that a solution in real time is not feasible. The Hopfield patent goes on to describe a network which electronically simulates neural activity to provide a system capable of retrieving particular information from a memory in the system, in response to an interrogation of the system. The patentee describes such a retrieval system as an associative memory, that is a memory that provides an output which is in some way associated with a particular input applied to the system. Such an netWork comprises amplifiers characterized by nonlinear, continuous and sigmoidal response curves. The input is processed in parallel. Such networks thus electronically process plural input signals to obtain collective decisional responses to which all of the input signals make a contribution in the range from 0 to 100%.

U.S. Pat. No. 4,752,906 likewise relates to a system employing neural computation to develop sequences of output vectors. This patent describes a neural network as having a highly parallel computational circuit comprising a plurality of electronic amplifiers. Each of the amplifiers feeds back its output signal to itself and to all of the other amplifiers.

Electronic implementations are inherently limited in the number of interconnections that can be made. It appears unlikely that an electronic circuit providing for more than about 1,000,000 i.e. $1 \times 10^6$ interconnections is feasible. To attempt to attain such a large number of interconnections in an electronic system results in very significant cross-talk problems. Further, electronic systems are seriously limited by power requirements. Such systems are also limited by volume and weight requirements.

The development of optical systems to carry out computations has progressively advanced. In an article by H. J. Caufield, J. A. Neff and W. T. Rhodes, "*Optical Computing: The Coming Revolution in Optical Signal Processing*", Laser Focus/Electro-Optics, November, 1983, p. 100, earlier progress in the application of optics to mathematical operations is reviewed. Examples of optical apparatus for performing digital matrix multiplication are disclosed in U.S. Pat. Nos. 4,567,569 and 4,809,204.

Further, optical machines that demonstrate different approaches to associative memory have been developed. One approach, developed by the California Institute of Technology, is referred to as photorefractive hologram neural networks. According to this approach, the selectivity of thick holograms in photorefractive materials is used as the primary driver for an optical associative memory. Systems based on this approach have demonstrated significant ability to learn new data. A second approach is represented by U.S. Pat. Nos. 4,739,496 and 4,750,153. In the optical systems disclosed in these patents, multiple, high-resolution images are stored in a holographic medium. When interrogated by an input image, the systems of the two latter patents recall the closest, most correct image stored. Even if these systems are addressed with an incomplete version of one of the stored images, they will output the complete image.

Limitations in the number of interconnections that can be made already have been recognized in optical systems designed according to these first two approaches. The photorefractive holograms used in systems according to the first and second approaches are known in the art as volume holograms which have relatively large thicknesses. Due to the thickness of the holograms, intermodulation noise becomes an increasing factor as the number of interconnections approaches $10^{10}$. Up to now, volume hologram approaches therefore have been limited to less than $10^{10}$ interconnections. When this number of interconnections is approached or exceeded in a system relying upon volume holography, the performance of such system lessens due to increasing problems in the way of lessening dynamic range, increasing intermodulation noise and degeneracy in the interconnections due to multiple order production by each modulation frequency recorded.

SUMMARY OF THE INVENTION

The system of the present invention overcomes the problems inherent in volume holograms and provides a neural network attaining $10^{12}$ interconnections without the losses in performance experienced with prior art optical systems. The disclosed system according to the present invention can be implemented solely from optical components. It utilizes a page-oriented holographic means comprising $N \times N$ arrays of very thin holograms arranged in a spatially localized or side by side manner on a single holographic plate or substrate. In the preferred embodiments of the system of the invention, N is a large number which is contemplated to equal or exceed $10^3$. Each individual hologram is formed to project a pattern of $N^2$ individual light beams each onto its own selected pixel of a spatial light modulator. When illuminated by laser light, the composite $N \times N$ holographic array means therefore projects up to $N^4$ individual light beams onto $N^2$ resolvable areas or pixels on the spatial light modulator.

Input to the system is applied to the spatial light modulator. The input is conveniently thought of as an input vector in the form of a vector arranged in two dimensions and having $N^2$ elements. The lenses in the system direct each pattern of $N^2$ modulated beams projected onto each of its $N^2$ pixels to a photodetector. Each pattern of encoded beams is modulated according to a corresponding element of the input vector.

The light beams projected into the system of the present invention by the holographic means thereby interconnect the input data applied to the spatial light modulator to associated pixels on the photodetector so that each element of the input vector makes some contribution, in the range of from 0 to 100%, to each element of an output vector generated by the detector. The projected beams are encoded by the holographic means with weights for each such interconnection made.

To complete simulation of the biological neural response, the photodetector provides output signals which are nonlinear transformations of the signals applied to it from the spatial light modulator. In the preferred embodiment, the transformation performed by the photodetector is described by a continuous, sigmoidal, monotonically increasing function to define a nonlinear threshold response. The transformed output signals can be fed back to the spatial light modulator as input if desired or can be fed forward to a second spatial light modulator.

The preferred embodiments of the system of the invention can be operated as a bidirectional associative memory (BAM). When queried by an input vector, X, these embodiments generate the closest paired vectors $X_{out}$ and $Y_{out}$ by performing a series of matrix vector multiplications and nonlinear transformations. Alternatively, the preferred embodiments can be made to provide interconnections whereby the system simulates operation of a Hopfield neural network.

A processing system according to the present invention for simulating a highly interconnected neural network comprises means for applying input signals, holographic means for providing optical signals indicative of first predetermined interconnection weights, spatial light modulating means responsive to the input signals for modulating the first optical signals to provide first modulated optical signals, means disposed in a path to detect the first modulated optical signals for providing detection signals which are a nonlinear function of a parameter of the optical signals, and means for directing the detection signals to the first spatial light modulating means as input signals.

Alternatively, the processing system for producing a highly interconnected neural network according to the present invention comprises a spatial light modulator which defines $N^2$ pixels, means for applying input signals to the spatial light modulator, a laser, a detecting means and a page-oriented holographic means for optically interconnecting the spatial light modulator and the detecting means. The holographic means comprises an $N \times N$ array of spatially-localized planar holograms with each such hologram projecting a distribution of up to $N^2$ light beams onto an associated pixel of the spatial light modulator when the holographic means is illuminated by light from the laser. The holograms encode a parameter of each of the projected light beams to represent an interconnection weight. The spatial light modulator modulates the projected light beams according to the input signals to provide up to $N^4$ modulated light beams. The detecting means is disposed in the path of the modulated light beams and comprises a detecting surface defining $N^2$ pixels interconnected with associated pixels of the spatial light modulator so that each detecting surface pixel receives up to $N^2$ modulated light beams from its associated pixel of the spatial light modulator, and means for nonlinearly transforming the parameter of each of the modulated beams to provide transformed signals.

BRIEF DESCRIPTION OF THE DRAWINGS

Further aspects and features of the present invention will be even more apparent from the following detailed description and drawings, and the appended claims In the drawings.

DETAILED DESCRIPTION OF THE INVENTION

System Overview

Figure 2:
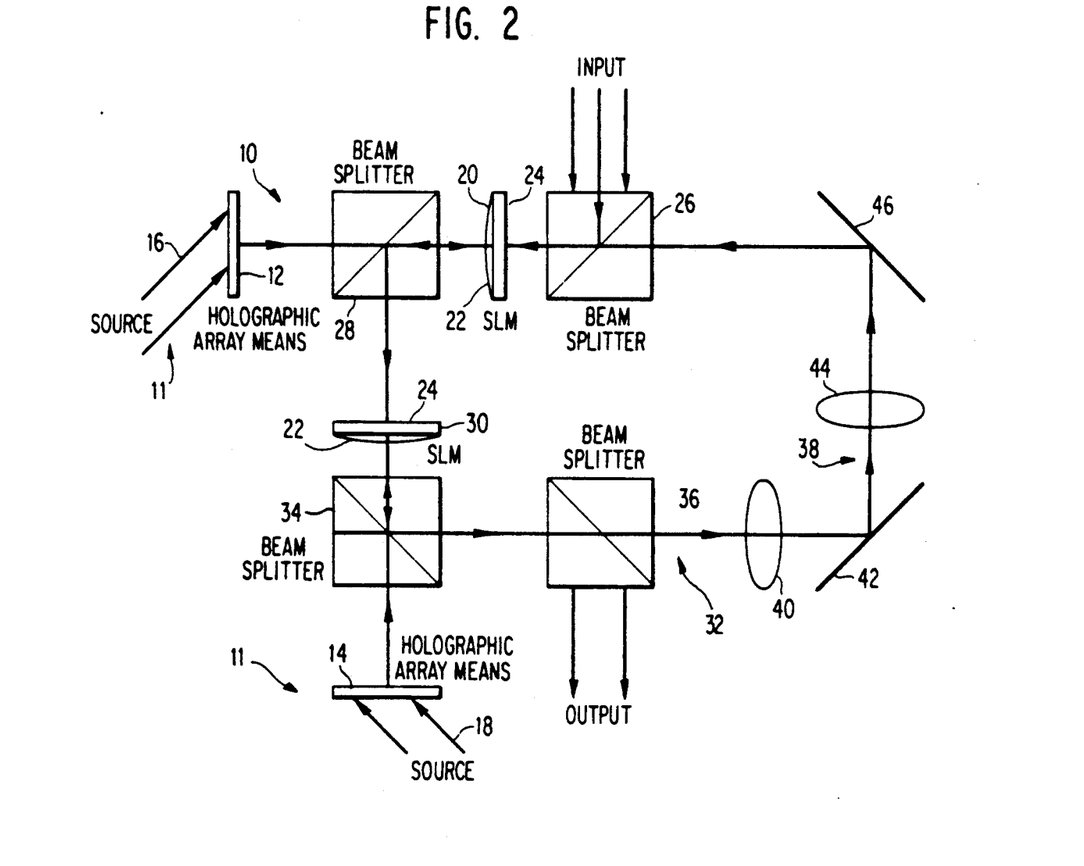
FIG. 2 is a ray diagram in block-diagrammic form of a preferred embodiment of the system according to the present invention.

In schematic form, FIG. 2 shows a preferred processing system 10 in accordance with the present invention for simulating a highly interconnected neural network. All of the elements used in implementing preferred system 10, as well as the other preferred embodiments, are conventional. According to the embodiment of FIG. 2, the processing system 10 is implemented with optical elements, however, as will be seen, the system could comprise various combinations of optical and electrical components while remaining well within the scope of the invention. Processing system 10 includes halographic means 11 provided by a first holographic array means 12 and a second holographic array means 14. Each of holographic array means 12 and 14 is shown as illuminated by a source 16, 18, of laser light. Each holographic array means 12 and 14 projects $N^4$ individual beams to make the desired number of interconnections in the system 10. Each individual light beam is encoded by its respective holographic array means 12, 14 to have one or more parameters representing the particular weight accorded the interconnection made by that beam. Each holographic array means 12 and 14 inserts all necessary interconnection weights simultaneously and in parallel.

Light passed by holographic array means 12 forms a predetermined pattern on a spatial light modulator (SLM) 20 which is disposed in the optical path therefrom. Spatial light modulator 20 is of the reflective type including a read side 22 and a write side 24. As apparent from FIG. 1, the interconnection-weight encoded light from holographic array means 12 provides the interconnection pattern on read side 22 of the SLM 20 while a beamsplitter 26 applies optical input signals to its write side 22. SLM 20 modulates the encoded light incident on its read face 22 in accordance with the optical input signals and reflects the modulated light to beamsplitter 28. Meanwhile, the second holographic array means 14 encodes laser light from its source 18 with a second set of interconnection weights and directs the $N^4$ encoded beams to a second SLM 30. Beamsplitter 28 directs the modulated light reflected by read side 22 of SLM 20 onto the write side 24 of the second SLM 30 as the input therefore. In this way, input applied to the write face 24 of SLM 20 is interconnected to the detecting or write face 24 of SLM 30 by the encoded beams projected by holographic array means 12. SLM 30 then modulates the pattern of light incident thereon from holographic array means 14 according to the modulated optical signals applied to its write side from SLM 20.

Geometrical relay optics 32 directs the modulated light reflected from the read side 22 of SLM 30 to the write side 24 of SLM 20 as the new input for system 10. Accordingly, the encoded beams projected by holographic array means 14 interconnect the write side 24 of SLM 30 to the write side of SLM 20. It is contemplated that after a certain time, the original optical input to beamsplitter 26 is terminated so that the modulated signals from SLM 30 become the only input signals to the SLM 20. At the same time that the modulated signals from SLM 30 are applied to SLM 20, relay optics 32 provides these modulated optical signals as the system output.

System 10 according to the present invention can be analyzed as performing four distinct steps. The first of these steps is a matrix multiplication $$A_1 X = Y$$

where $A_1$ is an $N^2 \times N^2$ matrix and X is a $N^2 \times 1$ column vector describing the input to the system 10. The elements of A' are considered to be the predetermined interconnection weights injected into system 10. It will be recognized by one of ordinary skill in the art that the system 10 could be operated as a Hopfield neural network such that when system is queried by an input vector X, it will provide, as output, a vector which is most nearly identical to the input vector from the vectors stored in matrix A. Similarly, where system 10 is arranged as a bidirectional associative memory (BAM), it will produce the closest associated vectors $X_{out}$ and $Y_{out}$ when queried by an input vector X. The second step comprises carrying out a nonlinear transformation on Y to generate a new vector Y'. Hereinafter, this step will be described by the relation:

$$NL(Y) = Y'$$

In the third step, a second matrix multiplication is carried out on Y' to obtain Y", namely $$A_2 Y' = Y''$$

Finally, a second nonlinear transformation represented by $$NL(Y'') = X'$$

is performed to complete one cycle of operation. In each subsequent cycle, the output vector X' can be applied as a new input vector X until the system settles on an output which is most nearly associated with the original input vector.

EMBODIMENT WITH POLARIZING, REFLECTIVE SPATIAL LIGHT MODULATORS

As mentioned in the foregoing, each holographic array means 12, 14 of halographic means 11 projects up to $N^4$ individual beams onto the read side 22 of the SLM 20, 30 in its the optical path. Each individual beam provides an interconnection in system 10. To accomplish the desired interconnections, each individual beam is encoded to have one or more parameters representing the particular weight accorded to the interconnection made by that beam. Since all of the $N^4$ individual beams projected by holographic array means 12, for example, are passed as a result of exposing the holographic, means to plane waves from its respective source 16, all the interconnections made and weighted by holographic array means 12 are projected into system 10 simultaneously and in parallel.

Figure 3:
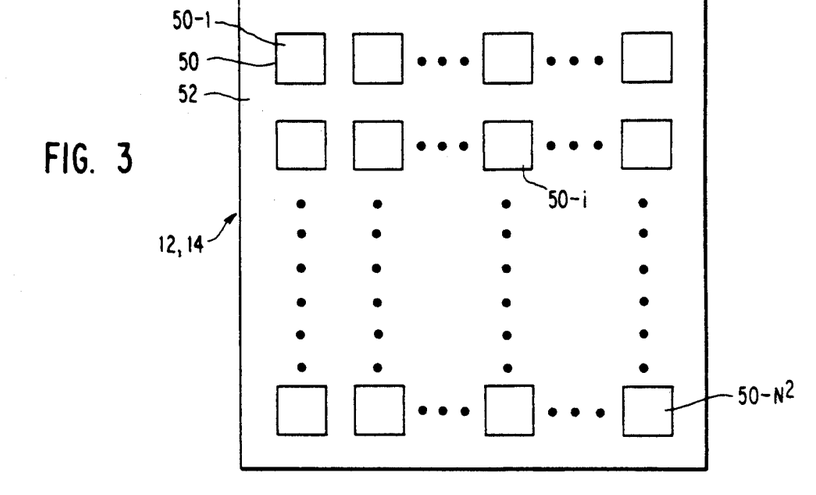
FIG. 3 is a schematic plan view of a page-oriented holographic means comprising an N x N array of thin holograms incorporated in the system of the present invention.

Holographic array means 12, 14 are depicted in detail in FIG. 3. Each holographic array means 12, 14 is of the page-oriented type which comprises $N^2$ individual holograms 50 arranged in an N x N, spatially localized array. Holograms 50 are affixed in a transparent substrate 52, such as a glass slide. As is known by those of ordinary skill in the art, the individual holograms 50 can be formed from a thermoplastic material or a photorefractive material. Holograms 50 could be recorded permanently, or alternatively, they could be of the erasable type. Depending upon whether holograms 50 are fixed or erasable, the interconnections made thereby could be fully in parallel or "partially in parallel and partially time sequential". That is, if the holograms 50 are permanently recorded, all the interconnections are made and weighted permanently and therefore system 10 is referred to as fully in parallel. On the other hand, if the holograms 50 are erasable, the interconnection weights can be changed during operation of system 10 and the system is referred to as partially in parallel and partially time sequential because the interconnection weights can be changed in time.

As compared to volume holograms used in prior art optical systems, the spatially localized holograms 50 have such a relatively small thickness as compared to their length and width that they can be considered as approximately two dimensional. It is contemplated that the holograms could have a thickness of, for example, 20 μm, and a width of about 1 mm on a side. Accordingly, holographic means 11 can provide for $10^{12}$ or more interconnections in system 10. Due to the relative two-dimensionality of holograms 50, system 10 is not limited by lessened dynamic range, intermodulation noise and interconnection degeneracy when $10^{12}$ or more interconnections are achieved in the system. Likewise system 10 avoids the cross talk problems arising in electrical devices when N approaches such a large number.

Each hologram 50 is formed to pass up to $N^2$ individual light beams when it is illuminated by laser light. The holograms 50 of holographic array means 12 are written so as to inherently project the interconnection weight encoded beams onto defined areas or pixels on the read side 22 of reflective SLM 20 whereby SLM 20 will reflect the beams to illuminate corresponding defined pixels on the write side 24 of SLM 30. The holograms 50 of holographic array means 14 likewise inherently focus $N^4$ individual beams onto the read face 22 of SLM 30 which similarly reflects the beams to relay optics 32 that serves to guide the reflected beams to predetermined areas on write face 24 of SLM 20. In this way, holograms 50 of holographic array means 12 and 14 are written to simultaneously interconnect the data input or the write faces 24 of the two SLMs 20 and 30 to each other. All of these interconnections are made optically and in parallel. Holographic means 12 and 14 thus automatically provide alignment for the optics in system 10.

As also mentioned briefly in the Overview, it is convenient to think of the $N^4$ individual beams introduced by holographic array means 12 as representing the elements of an $N^2 \times N^2$ matrix $A_1$. The elements of matrix $A_1$ designate the desired interconnection weights for operation of system 10. According to the preferred embodiments, the desired magnitude or "strength" of each interconnection is represented by the intensity of its respective projected beam.

Further, according to the preferred embodiments, the $N^2$ light beams produced by each hologram 50 are directed to a common location or pixel of the reflecting or read side 22 of SLM 20. In other words, the ith hologram, 50-i projects $N^2$ beams to a same pixel, referred to as $P_1$, of SLM 20. In this waY, the $N^2$ holograms 50 of holographic means 12 form $N^2$ resolvable patterns on $N^2$ different pixels $P_1$-$P_{N^2}$ on the read side 22 of SLM 20. The active areas on SLM 20, and SLM 30, are contemplated to be about 10 cm square at about 10 line pairs per mm.

Each of reflective SLMs 20, 30 in system 10 performs a modulation function, a detection function and a non-linear operation. The modulation function of SLMs 20, 30 will be considered first. As understood from FIG. 2, SLM 20 is positioned in the optical path provided by holographic array means 12 to reflect each pattern of $N^2$ beams incident on each pixel, $P_1$, of its read face 22, through beamsplitter 28, to corresponding pixels referred to as $P_1{'}$ through $P_n{^{2'}}$ on the write face 24 of SLM 30. It is also understood that each pixel on the read side 22 of SLM 20 likewise has a corresponding pixel, $P_1{'}$, on its own write side 24. It is onto these corresponding pixels, $P_1{'}$ through $P_{N^{2'}}$ on the write side 24 of SLM 20 that the input to system 10, in the form of the input vector X is provided through beamsplitter 26. Input vector X is thought of as a column vector in the form $$X = \begin{bmatrix} x_1 \\ x_2 \\ \cdot \\ \cdot \\ \cdot \\ x_i \\ \cdot \\ \cdot \\ \cdot \\ x_{N^2} \end{bmatrix}$$

When optical input signals representative of the vector X are applied to its write side 24, SLM 20 responds by modulating the $N^4$ interconnection weight encoded beams projected onto its read side 22 by holographic array means 12. In the preferred embodiments, this modulation is carried out by polarization. Depending upon the value of a particular element $x_1$ of X represented by an input beam incident on one of its write side pixels, $P_1{'}$, SLM 20 polarizes the $N^2$ individual beams reflected by its corresponding read side pixel $P_1$. Each group of $N^2$ beams projected from each hologram 50-i thus are polarized according to information carried by an input beam incident on the write side pixel $P_1{'}$ of SLM 20, and then reflected by the corresponding read side pixel, $P_1$ of SLM 20 to beamsplitter 28. Alternatively, it is also contemplated that the SLMs 20, 30 incorporated into system 10 could modulate the interconnection weight encoded beams in other ways as well. For example, the SLMs could effect amplitude modulation or phase modulation. Detection would be carried out accordingly.

In the preferred system 10, beamsplitter 28 analyzes the reflected, polarized beams from SLM 20. Beamsplitter 28 passes light projected by holograms 50 to the read side of SLM 20 without affecting the polarization of the beams. On the other hand, beamsplitter 28 acts as a polarizer for light entering from the opposite direction, namely light reflected therethrough from SLM 20. Thus, beamsplitter 28 cooperates as the analyzer for polarizing reflective face 22 of SLM 20 to modulate the intensity of the $N^4$ interconnection-weight encoded beams directed to the write side 24 of SLM 30.

Figures 4, 5:
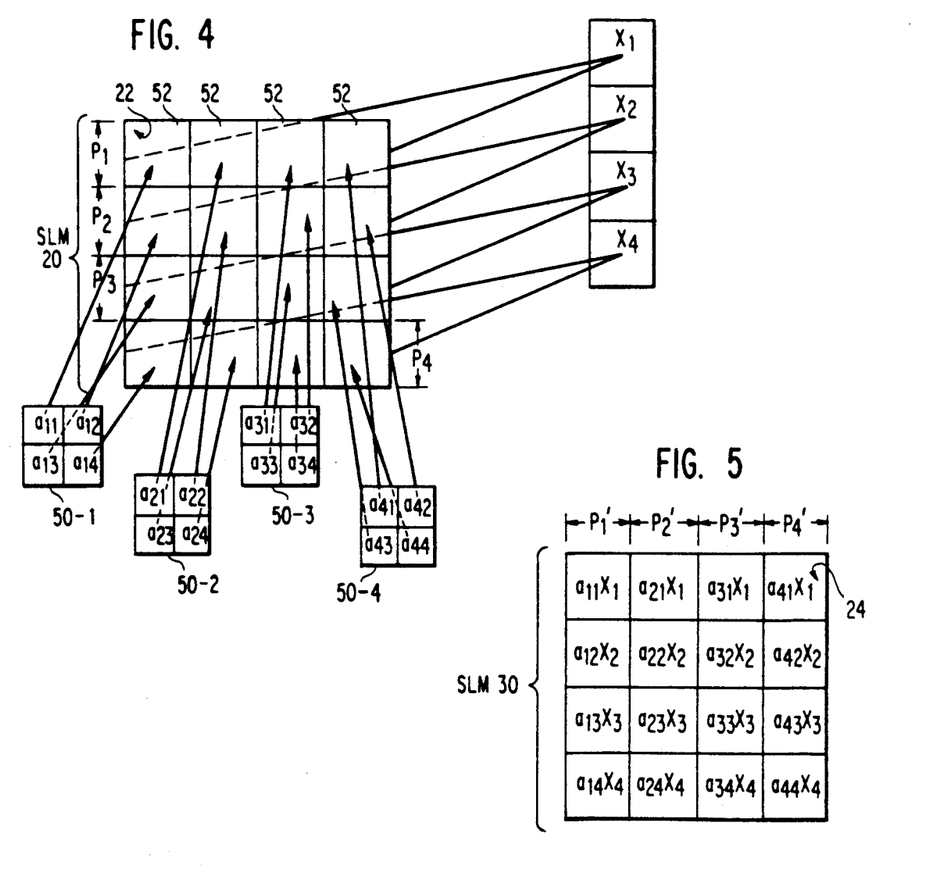
FIG. 4 is a diagram useful in understanding the distribution of light beams on the light-receiving sides of the spatial light modulators in the system of FIG. 2.
FIG. 5 is a diagram useful in understanding the distribution of modulated light beams directed from one of the spatial light modulators in the preferred system of FIG. 2 onto the other spatial light modulator.

FIGS. 4 and 5 are useful in illustrating the modulation performed by polarizing, reflective SLM 20 and analyzing beamsplitter 28 in a greatly simplified example where, for purposes of explanation, N is set to equal 2. FIG. 4 depicts one of various ways in which the read face 22 of SLM 20 may be partitioned to receive the encoded beams projected by holograms 50-1, 50-2, 50-3, and 50-4 as shown. Accordingly, the elements of the 4 x 4 matrix $A_1$, where $$A_1 = \begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix}$$

are projected onto read face 22. Each row of four partitions 52 on the read face 22 defines one of the read face pixels $P_1$, $P_2$, $P_3$ and $P_4$ respectively as indicated. Pixels $P_1$, $P_2$, $P_3$ and $P_4$ correspond with write face pixels $P_1'$, $P_2'$, $P_3'$ and $P_4'$ (not shown in FIG. 4 as they face the plane of the paper) which receive light indicative of the elements $x_1$, $x_2$, $x_3$, and $x_4$ of input vector X. SLM 20 polarizes the four illustrated beams representative of elements $a_{11}$, $a_{21}$, $a_{31}$, $a_{41}$ according to the value of element $x_1$ of X and so on according to the value of each element of X. When beamsplitter 28 analyzes the four distributions of four beams representative of the columns of $A_1$, this can be thought of as performing the portion of the multiplication of $A_1X=Y$ which comprises multiplying the four rows of the column vector X by the four rows of matrix $A_1$. Beamsplitter 28 analyzes and directs the beams reflected by SLM 20 to write face 24 of SLM 30. FIG. 5 depicts the partitioning of write face 24 of SLM 30 to delineate the pixels $P_1'$, $P_2'$, $P_3'$ and $P_4'$ as columns on the write face. The modulated light beams transmitted from beamsplitter 28 then would be distributed as indicated in FIG. 5. SLM 30 detects the intensity of each distribution of four modulated beams as each element of A multiplied by a corresponding element of X on pixels $P_1'$, $P_2'$, $P_3'$ and $P_4'$ to arrive at the product $Y=A_1X$. To continue with this example in detail, the detection function performed by SLM 30 can be thought of as summing the multiplied elements $$a_{11}x_1 + a_{21}x_2 + a_{31}x_3 + a_{41}x_4 = y_1$$
$$a_{21}x_1 + a_{22}x_2 + a_{23}x_3 + a_{24}x_4 = y_2$$
$$a_{31}x_1 + a_{32}x_2 + a_{33}x_3 + a_{34}x_4 = y_3$$
$$a_{41}x_1 + a_{42}x_2 + a_{43}x_3 + a_{44}x_4 = y_4$$

at its write side pixels $P_1'$, $P_2'$, $P_3'$, and $P_4'$. By this detection and summation of the modulated beam intensities SLM 30 carries out the row-wise summation for the matrix multiplication $A_1X=Y$.

Figure 6:
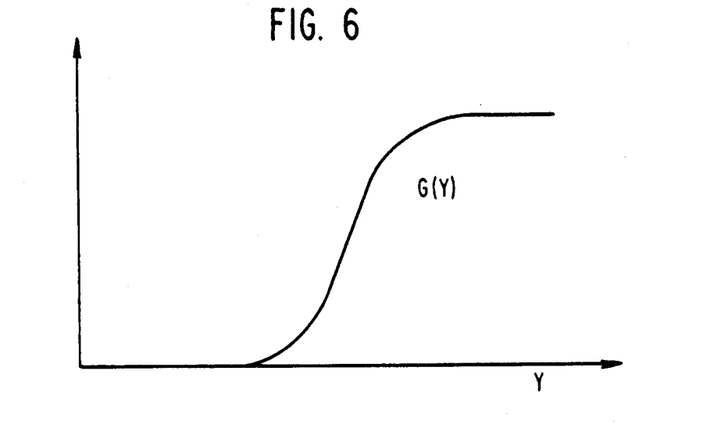
FIG. 6 illustrates a sigmoidal, monotonic input-output response characteristic utilized in the system of the present invention.

SLM 30 performs a nonlinear transformation of each detected element, $y_1$ of vector Y. FIG. 6 is a graphical representation of a function G(Y) which describes the response of SLM 30 to each detected y:. The function G(Y) is a continuous, monotone increasing, nonlinear function which maps the vector Y in $N^2$ space to a new vector Y' also in $N^2$ space to provide a sigmoidal threshold response. SLMs 20 and 30 are controllable to set the slope or steepness of their sigmoidal response curve G(Y) depending upon particular applications of system 10. SLM 30 performs this nonlinear transformation of Y to complete the second processing step carried out by system 10. The new vector Y' resulting from the nonlinear mapping becomes the input for the final two processing steps.

Holographic array means 14 and SLM 30 communicate through beamsplitter 34 in the same manner as SLM 20 and holographic array means 12. Holographic array means 14 likewise projects $N^4$ beams for interconnecting SLM 30 back to SLM 20 to complete system 10. According to the preferred embodiments, the $N^4$ beams projected by holographic array means 14 are encoded by intensity to provide the magnitudes of a second set of interconnection weights. Each hologram 50 of holographic array means 14 likewise projects $N^2$ beams to a pixel of reflecting face 22, corresponding to each column of a second matrix $A_2$.

Step 3 of the processing by system 10 comprises a second matrix multiplication given by $$A_2Y'=Y''.$$

Matrix $A_2$, introduced by holographic array means 14, can be chosen to have different elements depending upon how system 10 is desired to operate. This operation likewise is carried out in parallel by the cooperation of SLM 30, holographic array means 14, polarizing beamsplitter 34, and the write/detection side 24 of SLM 20 in the same way as described for SLM 20, holographic array means 12, beamsplitter 28, and write side 24 of SLM 30. That is, encoded light from holographic array means 14 is projected onto the read face 22 of SLM 30 and polarized thereby in response to the vector Y'. Analysis of the $N^4$ polarized beams reflected by read side 22 at beamsplitter 34 thereby provides modulated beams representative of the multiplication of each y' by the ith row of matrix $A_2$. Each of the resulting $N^4$ modulated light beams is directed to assigned pixels on the write side of SLM 20 as input therefore by geometrical relay optics 32. SLM 20 likewise detects the intensity of the associated beams to perform the row-wise summation and thereby complete the matrix multiplication $$A_2Y'=Y''.$$

The SLM 20 similarly carries out a second nonlinear transformation of vector Y" according to a nonlinear threshold function of the form G(Y) in FIG. 6 to obtain the vector X' which becomes the new input for system 10.

Rely optics 32 likewise are conventional and any combination thereof for directing the modulated beams reflected from read side 22 of SLM 30 to write side 24 of SLM 20 will suffice. In the embodiment of FIG. 2, relay optics 32 is seen to comprise a beamsplitter 36 which simultaneously provides the optical signals analyzed by beamsplitter 34 as output for system 10 and which directs the analyzed signals to a lens and mirror arrangement 38. Beamsplitters 26 and 36 are not required to perform an analyzing function and therefore do not need to be of the polarizing type. In arrangement 38, a first lens 40 focuses the analyzed signals for reflection by mirror 42. A second lens 44 likewise focuses the reflected signals onto a second mirror 46 which in turn directs the analyzed signals through beamsplitter 26 as the new input to SLM 20. In the embodiment of FIG. 2, the relaying is image wise. However, it is contemplated that, if desired, the relayed pattern could be transformed by the rely optics. It also is contemplated that other arrangements of lenses and mirrors or still other arrangements including prisms could be used for directing modulated light from SLM 30 onto the write side 24 of SLM 20. Alternatively, the rely optics could be provided in the form of an arrangement of optical fibers.

OPERATION MODES

Preferred system 10 provides for several modes of operation depending upon the desired form of the input vector X and the elements of matrices $A_1$ and $A_2$. As mentioned previously, system 10 can be arranged to operate as either a Hopfield neural network or a bidirectional associative memory (BAM) depending upon how the interconnection weights in the system are encoded. In particular, operation as a Hopfield neural network or a BAM depends upon the interconnection weight encoding by holographic array means 14 which projects the elements of $A_2$. If $A_2$ is the $N^2 \times N^2$ identity matrix $I_{N^2}$ where $$I_{N^2} = \begin{bmatrix} 10\ldots\ldots 0 \\ 01\ldots\ldots 0 \\ 001\ldots 0 \\ \ldots\ldots\ldots \\ \ldots\ldots\ldots \\ 000\ldots 10 \\ 000\ldots 1 \end{bmatrix}$$

the system behaves as a Hopfield network. Accordingly, light from holographic array means 14 which is reflected by read side 22 of SLM 30 is modulated to simply transmit the vector resulting from the nonlinear transformation performed by SLM 30. Thus, in operation as a Hopfield network, the third and fourth steps performed during processing by system 10 do not change the vector Y' obtained as a result of the nonlinear operation carried out by SLM 30. Rather the vector Y' is re-applied to the write side of SLM 20 as the new input. When operated as a Hopfield network, the steps performed by system 10 therefore can be summarized by the following:
(1) $AX = X'$
(2) $NL(X) = X''$
(3) $I_{N^2} X'' = X''$
(4) $NL(X'') = X''$
whereby $X''$ is applied to SLM 20 as input for the next iteration.

Alternatively, if $A_2$ is encoded as the transpose $A^T$ of the Matrix $A_1$ projected by holographic means 12, system operates as a BAM. This operation is summarized by the steps:
(1) $AX = Y$
(2) $NL(Y) = Y'$
(3) $A^T Y' = Y''$
(4) $NL(Y'') = X'$
In this mode, system 10 will produce the closest paired vectors $X_{out}$ and $Y_{out}$ associated with the interrogating input vector X.

Independent of whether system 10 is operated as a Hopfield network or a BAM, the system can be operated in a "unipolar" mode wherein all of the elements of the paired vectors X and Y and all of the elements of matrices $A_1$ and $A_2$ are positive or zero. This unipolar mode is considered to be analog operation and accordingly the elements of X, Y, $A_1$ and $A_2$ can have any positive value. When system 10 is operated in a unipolar mode, SLM 20 responds to the elements of initial input vector X by polarizing their associated distributions of interconnection-weight encoded beams such that when the associated beams are analyzed at beamsplitter 28, analog intensity values are obtained. The intensities of the $N^2$ beams defining each component $y_i$ of Y are then summed by detecting face 24 of SLM 30 as previously described. SLM 30 responds to the transformed vector Y' to likewise polarize the encoded beams projected by holographic array means 14 for analysis at beamsplitter 34. The intensities of associated beams are then likewise detected and summed at the write or detecting face 24 of SLM 20.

Alternatively, system 10 can be operated in a "bipolar" mode wherein all of the elements vectors of X and Y are defined to have one of two possible values, for example 0 or 1, or, for example $-1$ or $+1$. In the bipolar mode these two different values easily can be represented by two orthogonal polarization states. The elements of matrices $A_1$ and $A_2$ can have any value in the bipolar mode.

As is understood, system 10 may be operated asynchronously and continuously in time. Alternatively, system 10 can be operated synchronously according to clock pulses. This is commonly referred to in the art as "systolic" operation.

NORMALIZATION

In order to simplify the detection process in the preferred system 10 according to the present invention, it is contemplated to make the input and output vectors bipolar and to normalize the elements of matrices A' and A". It will be assumed for the following discussion concerning normalization that system 10 is operated as a BAM, in a bipolar mode. According to this mode, the elements of the input and output vectors X and Y are provided according to two orthogonal polarization states to have the two possible values of $-1$ or $+1$. These two polarization states will hereinafter be denoted as $-1$ and $+1$.

While the vector elements attain only the values $+1$ and $-1$, the elements of the matrices A and $A^T$ can be any positive or negative number representing the desired interconnection weights. The beams projected by holographic means 12 and 14 are polarized to either of the two orthogonal polarization states to encode the sign of the matrix elements. The intensity of each projected beam encodes the magnitude of the respective matrix element. Mathematically, the matrix multiplication requires only that the elements of the matrices be multiplied by $+1$ or $-1$. To carry out the multiplication optically requires no more than programming SLM 20 according to the input vector to reflect each interconnection-weight encoded beam either with or without changing its polarization state. Simple reflection without changing the polarization state corresponds to multiplication by unity. Rotation of the polarization state of the encoded beam by 90 degrees represents multiplication by $-1$.

After multiplication of the matrix elements, detection of the polarization states and the intensity of the individual beams likewise are made to determine the elements of Y such that $$y_i = \Sigma a_{ij} x_j \tag{1}$$

where $a_{ij}$ is an element of matrix A. Each element of Y receives one contribution from each element of X. Each element of Y likewise will have a distinct polarization state indicative of its sign and an intensity indicative of its magnitude. The nonlinear operation thereafter will set the magnitude of each $y_i$ to $+1$ or $-1$. Thus, detection of each $y_i$ is carried out by determining the dominant polarization state of each $y_i$. This detection operation can be mathematically described as $$y_i = \begin{cases} +1 & \text{if } \Sigma\ (a_{ij}\ x_j)^{(p)} > \Sigma\ (a_{ij}\ x_j)^{(n)} \\ -1 & \text{if } \Sigma\ (a_{ij}\ x_j)^{(p)} < \Sigma\ (a_{ij}\ x_j)^{(n)} \end{cases} \quad (2)$$

where the symbol "(p)" denotes positive contributions to each $y_i$ and "(n)" denotes the negative contributions. If each $y_i$ is pre-normalized to $+1$ or $-1$, the only required operation is to determine the sign and thus detection is simplified because the magnitudes of the elements are known. It would be advantageous to perform a first order normalization of each element $y_i$ in the sense $$\Sigma |(a_{ij}\ x_j)| = 1. \quad (3)$$

As normalization in this way has been found to be more difficult to perform, it is preferred to normalize the columns of both $A$ and $A^T$. Matrices $A$ and $A^T$ are considered as a series of columns such that $$A = [a_1, a_2, \ldots a_N, \ldots a_{N^2}], \quad (4)$$

where $\Sigma |a_{ij}| = M_i$. $\quad (5)$

If the elements of the vector $X$ which is multiplied by $A$ have values of only $+1$ and $-1$, the absolute magnitude of any $y_1$ also will be $M_i$. The preferred normalization process multiplying each column $a_1$ of $A$ and $A^T$ by an appropriate scaler factor $c_1$ such that the sum of the absolute magnitudes of the elements of $a_1$ is 1. This may be written as $$\overline{A} = [c_1 a_1, c_2 a_2, \ldots c_N a_N, \ldots c_{N^2} a_{N^2}] \quad (6)$$

so that $$c_1 \Sigma |a_{1j}| = c_2 \Sigma |a_{2j}| = \ldots c_N \Sigma |a_{Nj}| = 1 \quad (7)$$

where $c_1 = 1/M_1$, and $a_{1j}$ is the jth element of $a_1$. Therefore, it is necessary only to detect the magnitude of one of the polarization states. Then the whole detection process in the operation $$Y' = \overline{A}X \quad (8)$$

reduces to the determination of the vector components according to $$y_i = \begin{cases} +1 & \text{if } y_i = \Sigma\ (a_{ij}\ x_j)^{(p)} > \tfrac{1}{2} \\ -1 & \text{if } y_i = \Sigma\ (a_{ij}\ x_j)^{(p)} < \tfrac{1}{2} \end{cases} \quad (9)$$

From the foregoing it is seen that $$c_n \Sigma |a_{nj}| = a_n \quad (10)$$

where $a_n = 1$ for an ideal detector. It is not unusual that the detector threshold may vary across the detecting surface of a given photodetector device. Then, it may be required to change the normalization by selecting the constant $a_n$ as determined by practical considerations of the detector used. This normalization does not affect the needed decision of equation (2) and, thus, does not affect system performance in any way other than to simplify the optical components in the system.

CASCADING NETWORKS

Figure 7:
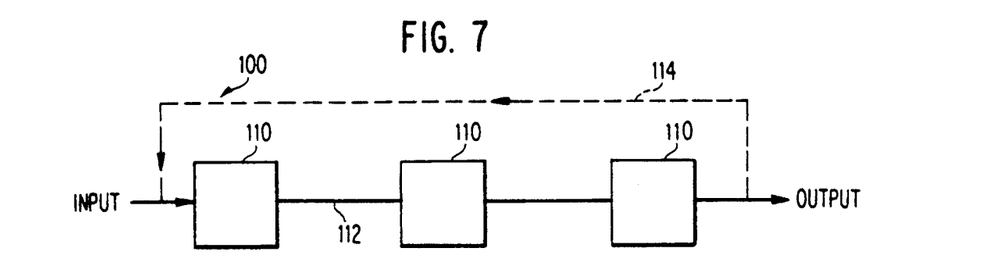
FIG. 7 is a block diagram of an exemplary multilayered or cascading arrangement of optical systems according to the invention.

It is to be understood that any number of optical networks arranged as in preferred system 10 can be made a part of a larger, overall system. For instance, FIG. 7 is a block diagram showing an exemplary cascading network 100 according to the present invention. Each network 100 comprises a number of stages 110; three such stages are shown in FIG. 7. Where each stage comprises a holographic means, a spatial light modulator means and an analyzer as discussed in connection with system 10, the analyzed-modulated output beams from each upstream stage are applied to the SLM of its adjacent downstream stage in a feed-forward arrangement. Indeed as is apparent, cascading network 100 could be a purely feed-forward arrangement with no feed back as indicated by the solid ray line 112 in FIG. 7. Alternatively, as indicated by the broken ray line 114, network 100 could be provided with feedback from, for example, its rightmost or terminal stage to its leftmost or initial stage.

EMBODIMENT WITH TRANSMISSIVE SPATIAL LIGHT MODULATORS

Figure 8:
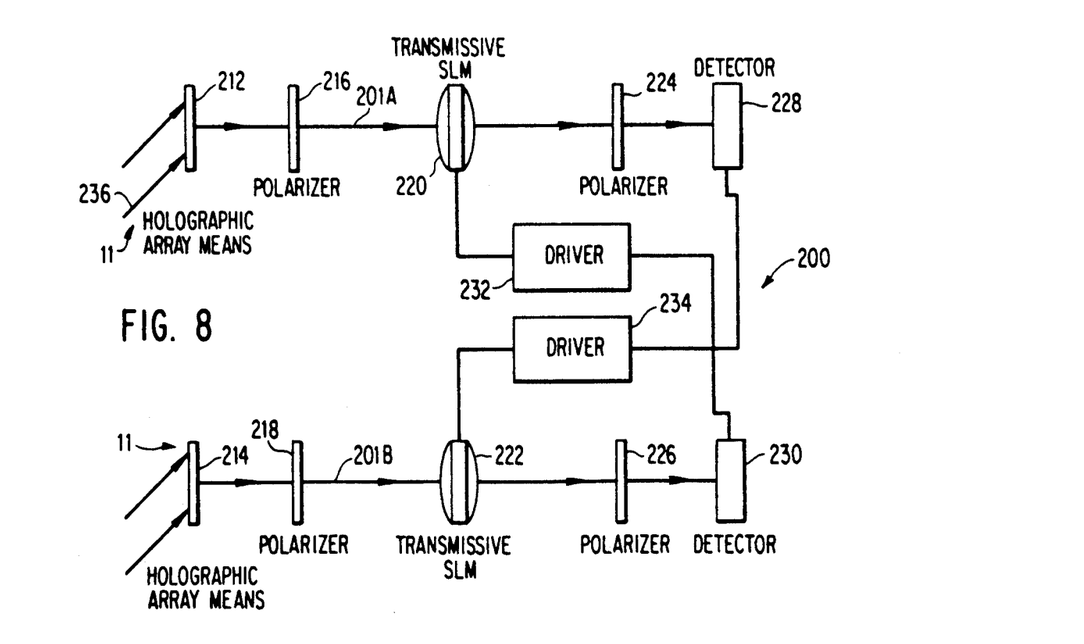
FIG. 8 is a diagram similar to FIG. 2 of an alternative embodiment of the system of the present invention.

FIG. 8 shows a system 200 which is arranged with transmissive rather than reflective spatial light modulators. System 200 comprises two distinct optical paths 201A, 201B which are placed in communication by electronic elements. Each optical path comprises a holographic array means 212, 214 a first or entrance polarizer 216, 218, a transmissive SLM 220, 222, a second or exit polarizer 224, 226, and a photodetector means 228, 230. An electronic driver means 232, 234 controls the transmissivity of each of SLMs 220 and 222.

Illumination of holographic array means 212 by laser light source 236 likewise projects $N^4$ interconnection weight encoded beams into the system 200. Polarizer 216 polarizes the encoded light beams before they illuminate assigned pixels of transmissive SLM 220. Input to system 200 again can be thought of as an input vector $X$ is programmed into system 100 by driver 232. According to the embodiment of FIG. 8, vector $X$ which is provided in the form of electrical signals. Driver 232 could comprise a computer or the like for controlling its associated SLM 220 to modulate and transmit beams representative of the column-wise multiplication of $A_1X = Y$. An analyzing polarizer 224 is provided in the optical path between SLM 220 and its respective photodetector 228. Each pattern of $N^2$ modulated beams directed onto photodetector 228 through analyzer 224 likewise corresponds to a component $y_1$ of $Y$.

Photodetector means 228 receives the modulated light beams transmitted through SLM 220 and analyzing polarizer 224 likewise to detect their intensities and thereby perform the matrix multiplication $$A_1X = Y.$$

Photodetector means 228 is programmed to provide electrical output signals according to the nonlinear function $G(Y)$ illustrated in FIG. 6 in response to the summed intensities of the detected optical signals. Accordingly, photodetector means 228 performs the nonlinear transformation $NL(Y)=Y'$ and applies electrical signals indicative of $Y'$ to the driver 234 which controls SLM 222. Driver 234 in turn programs SLM 222 to modulate the encoded beams projected by its associated holographic array means 214 according to the signals indicative of $Y'$. In this way, the second matrix multiplication $A_2Y'=Y''$ is performed when the modulated signals transmitted through SLM 222 and analyzing polarizer 226 are detected by photodetector means 230. Photodetector means 230 likewise performs the nonlinear thresholding operation $NL(Y'')=X'$. The resulting vector $X'$ is provided as output for system 200 and is fed back to driver 232 and its associated SLM 220 as the next input to system 200. System 200 thus is seen to operate in the same manner as system 10 of FIG. 2. System 200 likewise can be operated continuously and asynchronously.

One of ordinary skill in the art appreciates that different combinations of reflective and transmissive spatial light modulators and that different photodetection means may be used for implementation of the simulating system according to the present invention. It is recognized that the spatial light modulating means in the system of the present invention could be either optically or electrically addressed. Further such spatial light modulators could be of the polarization-modulation, amplitude-modulation, or phase-modulation type. Detection devices would be provided accordingly to evaluate any given parameter of the modulated independent beams and perform the necessary nonlinear operations on the detected data.

Figures 9, 10, 11:
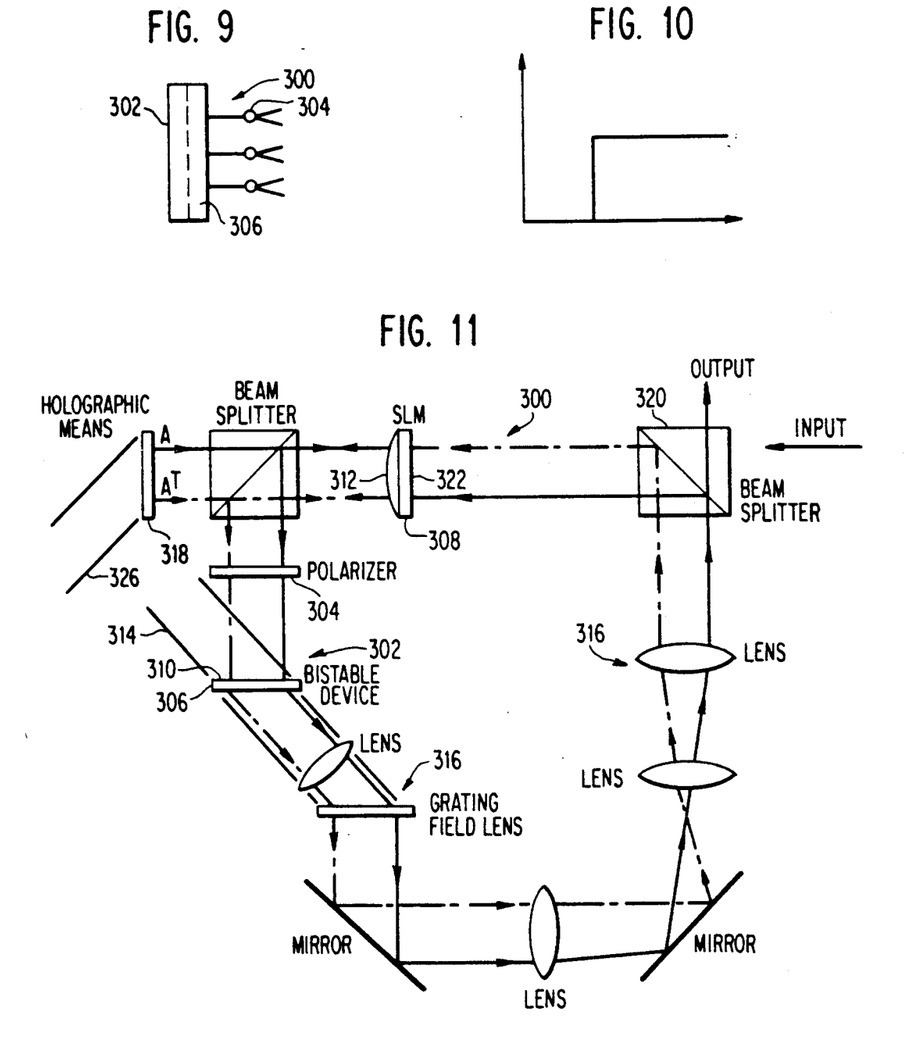
FIG. 9 illustrates an alternative detector arrangement suitable for use in the preferred embodiments.
FIG. 10 illustrates a clipped input-output characteristic.
FIG. 11 is a diagram similar to FIG. 2 of another embodiment of the system of the present invention.

As for the photodetection means, FIG. 9 illustrates a photodetector means 300 which has a summing-detecting surface 302, a plurality of light emitting diodes 304 (LEDS) and a driver 306 for the LEDS. According to this arrangement, each LED is made to generate light in accordance with the result of the nonlinear transformation performed bY the photodetector means 300. It is further contemplated that, with respect to FIG. 8, photodetector means 230 could comprise a variety of different photoresponsive devices. For example, the photodetector means 228 and 230 could comprise charge coupled devices (CCD) or charge injection devices (CID). These devices could be provided in spatially discreet or spatially continuous arrays as understood in the art. Further still, it is contemplated that the photodetector means 228 and 230 of FIG. 8 could be replaced by a television detection system including vidicons (not shown). Any such implementation of the photodetection means can be provided to have the sigmoidal response curve of FIG. 6 for carrying out the prescribed summation-detection and nonlinear transformation. Moreover, these aforementioned electrical devices, as well as many optical detecting devices including spatial light modulators can be adjusted to adjust their response curves to provide a clipping response as illustrated in FIG. 10. Similarly, many such devices can be made to provide a level-restoring response for setting their outputs to 0 or 1 according to binary operations.

EMBODIMENT WITH BISTABLE DETECTOR

In FIG. 11 there is shown an embodiment of a system 300 of the present invention wherein an alternative optical detecting means 302 is substituted for the downstream spatial light modulator. Optical detecting means 302 comprises a polarizer 304 and an optical device 306 located to receive light passed by polarizer 304 from a reflective SLM 308. Polarizer 304 analyzes the reflected beams from SLM 308. The light-detection surface 310 of device 306 is thus illuminated by the $N^4$ modulated beams reflected by the read side 312 of SLM 308 and is also illuminated by a pattern of collimated laser beams, which hereinafter, will be referred to as a pattern of holding beams 314. In the embodiment of FIG. 11, device 306 is of the spatially continuous type wherein its detecting surface 310 is a continuous plane. Alternatively, it is recognized that device 306 may be made up of a plurality of discrete devices arranged to form a composite detection surface.

Figure 12:
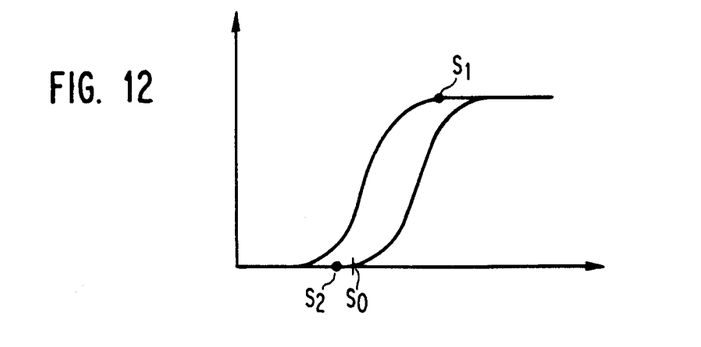
FIG. 12 illustrates another nonlinear response input-output characteristic suitable for use in the preferred embodiments of the present invention.

Optical device 306 responds to the individual modulated light beams from SLM 308 and holding beams 314 by either passing each superimposed modulated beam and holding beam to relay optics 316 or by obstructing the superimposed beams. In preferred system 300, device is a bistable device having a nonlinear response curve which is shown in FIG. 12. This response provides two regions of stability between points $s_1$ and $s_2$. When the combined light intensity from the holding beam 314 and the individual modulated beams from SLM 308 exceed a threshold level $S_0$, device 306 passes the superimposed beams therethrough as a resultant beam to the downstream geometrical relay optics 316. Each resultant beam corresponds to a $y_1$ having the value $+1$. If the combined signal beam and holding beam intensity do not exceed threshold $S_0$, then the element $y_1$ will be registered as a 0. In the preferred embodiment, bistable device has a threshold set at $\alpha_1/2$. Due to the presence of the holding beams 314, the output information beams are amplified. The amplification or gain provided by bistable device 306 is dependent upon the intensity of the holding beams. Like the SLMs which perform the detection function for systems 10 and 200, bistable device can be set to effect clipping or level restoring.

As apparent from FIG. 11, SLM 308 is also of the reflective type which modulates the encoded beams projected from holographic means 318 by polarization. In operation, the input vector $X$ preferably is introduced into system 300 through beamsplitter 320 to SLM 308 as a binary vector having elements comprising only 0 or 1. This pattern serves as the write beam incident on the write side 322 of SLM 308. If an element $x_1$ (incident on a pixel of read side 322) of input vector $X$ has the value 1, SLM 308 will reflect the associated interconnection weight encoded light from holographic means 318 in its original polarization to represent multiplication by $+1$. Unaddressed, i.e. unilluminated, pixels on the write side 322 will signal SLM 308 to rotate the polarization of the associated encoded beam by 90 degrees to effect multiplication by $-1$ as the beams are reflected.

Holographic means 318 comprises two complete arrays of $N^2$ page-oriented holograms of the type discussed in connection with FIG. 3. One array stores the matrix $A$ and the other $A^T$. After illumination by laser source 326, holographic means 318 projects the images of both $A$ and $A^T$ onto SLM 308. The sign of each matrix element is encoded by one of two orthogonal polarization states. Beam intensity encodes the magnitude of each element. The image, carrying the results of the vector-matrix multiplication, is reflected back through beamsplitter 324 and focussed onto detecting means 302.

So arranged with holographic means 318 providing both matrices $A$ and $A'$ preferred system 30 operates as a BAM. The light pattern representing input vector $X$, represented by the solid ray line in FIG. 11, is applied to a designated portion of the write side 322 of SLM 308 which write side portion corresponds to an associated portion of its read side 312 receiving interconnection weight encoded beams indicative of the elements of matrix A. The intensities and polarization states of the projected beams from holographic means 318 represent the magnitude and sign of the interconnection weights represented thereby. These encoded beams are polarization modulated by SLM 308 according to the input vector 304. Analysis of the reflected modulated beams is performed at polarizer 304. Bistable device 306 thereafter automatically detects the beams passed by analyzing polarizer 304 and performs the matrix multiplication step $$AX=Y$$

and the nonlinear operation $$NL(Y)=Y'$$

on the detected beams and the incident holding beams 314 in accordance with the response curve shown in FIG. 12. Beam patterns representing vectors Y and Y' also are understood as indicated by the solid ray lines in FIG. 11. Vector Y' is thus derived from the modulated beams and the holding beams, and it likewise provided in binary form to be routed back to SLM 308 for further iterations. At the same time, it is also made available as an output. In the second iteration, Y' is multiplied by the matrix $A^T$ as indicated by the dot-dash rayline to complete the second matrix multiplication step $$A^T Y' = Y''.$$

As seen from FIG. 11, this alternate multiplication by A and $A^T$ is achieved by focusing the beam patterns indicative of X, A, $A^T$, Y, Y', and Y'' onto the two designated locations or portions on SLM and the bistable device 306. The formation of holographic means 318 automatically provides for the simultaneous projection of the images for multiplication by A and $A^T$. Accordingly, when vector Y'n is relayed back to the corresponding location on SLM 308, the SLM performs the second matrix multiplication $$A^T Y' = Y''$$

whereafter detecting means 302 analyzes the reflected beams and performs the second nonlinear transformation on Y'' according to $$NL(Y'')=X'$$

to provide the new input vector X'. Operation thus continues asynchronously or synchronously as desired.

It is noted that vectors X and Y need not use up all of the available pixels of SLM 308. Rather, as understood by those of ordinary skill in the art it is possible to partition the inputs and outputs in a fashion such as that disclosed in "Architectures for Optoelectronic Analogs of Self-organizing, Neural Networks", Optics Letters, 12, 6, (1989) to achieve simulation of multilayer systems and/or to provide various feedback arrangements. Various relay optics arrangements would be selected accordingly. In view of the large number of vector elements available in this simulated BAM, such partitioning can be handled rather easily. The actual partitioning is arbitrary, and projection of the matrixes can be adjusted accordingly.

An alternative to the holding beams in the embodiment of FIG. 11 would be to adjust the intensities of the interconnection weight encoded beams. Holographic means 318 could be made to project encoded beams having sufficient intensities to obviate the holding beams. Further, it is understood that the intensity of the interconnection weight encoded beams could be adjusted to accommodate for threshold variations in the detecting surface 310.

It is to be understood that there are various changes and modifications to the system disclosed herein which changes and/or modifications may be made by one of ordinary skill in the art, but such skill would result in a system well within the scope of the invention as set forth in the claims.

What is claimed is:

1. An apparatus for simulating a highly interconnected neural network, said apparatus comprising:
   means for applying input signals;
   page-oriented holographic means for providing first optical signals indicative of first predetermined interconnection weights;
   first spatial light modulating means responsive to input signals from said input-signal applying means for modulating first optical signals provided by said holographic means to provide first modulated optical signals and;
   means for detecting first modulated optical signals provided by said spatial light modulating means and for performing a nonlinear transformation of a parameter of said first modulated optical signals; and
   means adapted to direct said detection signals to said first spatial light modulating means as input signals.

2. An apparatus as claimed in claim 1, wherein said holographic means comprises a first holographic array means including a plurality of holograms and a substrate for spatially arranging said holograms in an array.

3. An apparatus as claimed in claim 2, wherein said means for detecting and transforming comprises a second spatial light modulating means.

4. An apparatus as claimed in claim 3, wherein said page-oriented holographic means comprises a second holographic array means including holograms for providing second optical signals indicative of second predetermined interconnection weights, and wherein said parameter of said first modulated signals is the intensity thereof;
   said second spatial light modulating means modulating second optical signals provided by said second holographic arrays means to provide second modulated optical signals as a nonlinear function of the intensity of first modulated signals provided by said first spatial light modulating means.

5. An apparatus as claimed in claim 4, wherein one of said spatial light modulating means comprises a reflective spatial light modulator.

6. An apparatus as claimed in claim 4, wherein one of said spatial light modulating means comprises a transmissive spatial light modulator.

7. An apparatus as claimed in claim 4, wherein said first and second modulating means each comprise spatial light modulators and wherein said applying means comprises geometrical optical means for providing an optical path from said second spatial light modulator to said first spatial light modulator.

8. An apparatus as claimed in claim 4, wherein said holograms of at least one of said holographic array means are erasable whereby said interconnection weights can be varied.

9. An apparatus as claimed in claim 2, wherein said detecting and transforming means comprises photodetector means for providing electrical signals representative of a nonlinear transformation of said parameter.

10. An apparatus for simulating a highly interconnected neural network, said apparatus comprising:
a spatial light modulator defining $N^2$ pixels;
means for applying input signals to said spatial light modulator;
a laser;
a detecting and nonlinear transforming means; and
a page-oriented holographic means for optically interconnecting said spatial light modulator and said detecting means;
said holographic means comprising an N x N array of spatially-localized planar holograms, each hologram projecting a distribution of up to $N^2$ light beams onto an associated pixel of said spatial light modulator when said holographic means is illuminated by light from said laser, said holograms encoding each light beam projected thereby to represent an interconnection weight;
said spatial light modulator modulating light beams projected by said holographic means according to input signals applied by said input signal applying means to provide up to $N^4$ modulated light beams;
said detecting and nonlinear transforming means being disposed in the path of modulated light beams from said spatial light modulator and comprising a detecting surface defining $N^2$ pixels interconnected with associated pixels of said spatial light modulator so that each detecting surface pixel receives up to $N^2$ modulated light beams from its associated pixel of said spatial light modulator, and
said detecting and nonlinear transforming means nonlinearly transforming a parameter of each modulated beam from said spatial light modulator to provide transformed signals.

11. An apparatus as claimed in claim 10, further comprising means for applying transformed signals provided by said detecting and nonlinear transforming means to said spatial light modulator as input signals therefore.

12. An apparatus as claimed in claim 10, wherein said spatial light modulator polarizes beams projected by said holographic means to provide polarized, encoded beams and said apparatus comprises analyzer means, disposed in the path of modulated light beams from said spatial light modulator to said detecting and nonlinear transforming means, for analyzing encoded beams polarized by said spatial light modulator to provide said modulated beams.

13. An apparatus as claimed in claim 12, wherein the intensity of projected beams from said holographic means represents the magnitude of said interconnection weights.

14. An apparatus as claimed in claim 13, wherein said detecting and nonlinear transforming means comprises a second spatial light modulator, wherein said apparatus further comprises a second analyzer means, and wherein said page-oriented holographic means comprises a second N x N array of spatially localized holograms which each project a second distribution of up to $N^2$ light beams onto each pixel of said second spatial light modulator to interconnect said second spatial light modulator with said first spatial light modulator, light beams projected by said holograms of said second array being encoded to represent second interconnection weights, said second spatial light modulator polarizing second encoded light beams projected by said holograms of said second array according to transformed signals provided by said detecting and transforming means to provide up to $N^4$ second polarized encoded beams which are analyzed by said second analyzer to provide up to $N^4$ second modulated light beams to said applying means.

15. An apparatus as claimed in claim 14, which performs the matrix operation steps of:
(1) $A_1X = Y$
(2) $NL(Y) = Y'$
(3) $A_2Y' = Y''$
(4) $NL(Y'') = X'$
and wherein
said input signal applying means applies input signals to said first spatial light modulator which represent an input vector X having $N^2$ elements $x_i$;
said first $N^4$ encoded light beams projected by said first N x N array of holograms represent the elements of the $N^2$ x $N^2$ matrix $A_1$;
said second $N^4$ encoded light beams projected by said second N x N array of holograms represent the elements of the $N^2$ x $N^2$ matrix $A_2$;
the sum of the intensities of said first modulated beams incident on each pixel of said detecting surface of said second spatial light modulator represent the result of the matrix multiplication $$A_1X = Y; \tag{1}$$

said first transformed signals represent the result of the nonlinear transformation step $$NL(Y) = Y'; \tag{2}$$

the sum of the intensities of said second modulated beams incident on each pixel of the detecting surface of said first spatial light modulator represent the result of the matrix multiplication $$A_2Y' = Y'' \tag{3};$$

and
said second transformed signals represent the result of the nonlinear transformation step $$NL(Y'') = X' \tag{4}.$$

16. An apparatus as claimed in claim 10, wherein said detecting and transforming means comprises an analyzer and a bistable device.

17. An apparatus as claimed in claim 16, wherein said modulated signals are nonlinearly transformed according to the function described by the equation:

$$y_i = \begin{cases} +1 & \text{if } y_i = \Sigma \ (a_{ij}\,x_j)^{(p)} > \mathbf{i} \\ -1 & \text{if } y_i = \Sigma \ (a_{ij}\,x_j)^{(p)} < \mathbf{i} \end{cases}$$

where $a_{ij}$ are the elements of the matrix $A_1$ or $A_2$; $X_j$ are elements of the vector X; and (P) denotes positive contributions.

18. An apparatus as claimed in claim 10, wherein said detecting and transforming means comprises a plurality of LEDs and LED drivers.

19. A neural network simulating device comprising:
means providing at least two two-dimensional data planes; and
means for optically interconnecting said data planes, said interconnection means including
  holograph means comprising holograms for providing light beams having a detectable parameter along optical paths between said planes, and
  means disposed in at least one of said optical paths for nonlinearly transforming said parameter of said light beams, said holograms being spatially localized in an array on a substrate.

20. An apparatus for processing a two-dimensional array, said apparatus comprising:
a spatial light modulator;
two-dimensional, page-oriented holographic means for providing data in the form of a light modulation pattern incident on said light modulator, said holographic means including an array of spatially-localized, planar holograms, said spatial light modulator modulating said incident light pattern and providing light in a modulated pattern comprising a discrete array of points of light;
means for performing nonlinear operations on said modulated pattern, said performing means forming an output light pattern providing output data; and
means for transmitting said output light pattern to said spatial light modulator as input therefore.

* * * * *